United States Patent

[11] 3,557,943

| [72] | Inventor | Richard Broser |
| | | Royal Oak, Mich. |
| [21] | Appl. No. | 584,445 |
| [22] | Filed | Oct. 5, 1966 |
| [45] | Patented | Jan. 26, 1971 |
| [73] | Assignee | Accum-Matic Systems, Inc. |
| | | Detroit, Mich. |
| | | a corporation of Michigan, by mesne assignment. |

[54] AUTOMATIC ACCUMULATING TRANSFER MECHANISM
4 Claims, 3 Drawing Figs.

[52] U.S. Cl. .................................................. 198/221
[51] Int. Cl. .................................................. B65g 25/08
[50] Field of Search .......................................... 198/19, 34, 221

[56] References Cited
UNITED STATES PATENTS

| 3,127,981 | 4/1964 | Sharpe .................. | 198/221 |
| 3,322,259 | 5/1967 | Milazzo .................. | 198/219 |
| 3,369,650 | 2/1968 | Caretto .................. | 198/219 |

*Primary Examiner*—Edward A. Sroka
*Attorney*—Cullen, Sloman & Cantor

ABSTRACT: An accumulating transfer machine provides means for automatically advancing all workpieces located rearwardly of an empty work station on a single-stroke cycle of the transfer bars. This is accomplished by a detector bar which senses the absence of a workpiece and sets up the next rearward dog, which in turn is interconnected to all of the remaining rearward dogs to similarly set them up into workpiece-engaging position.

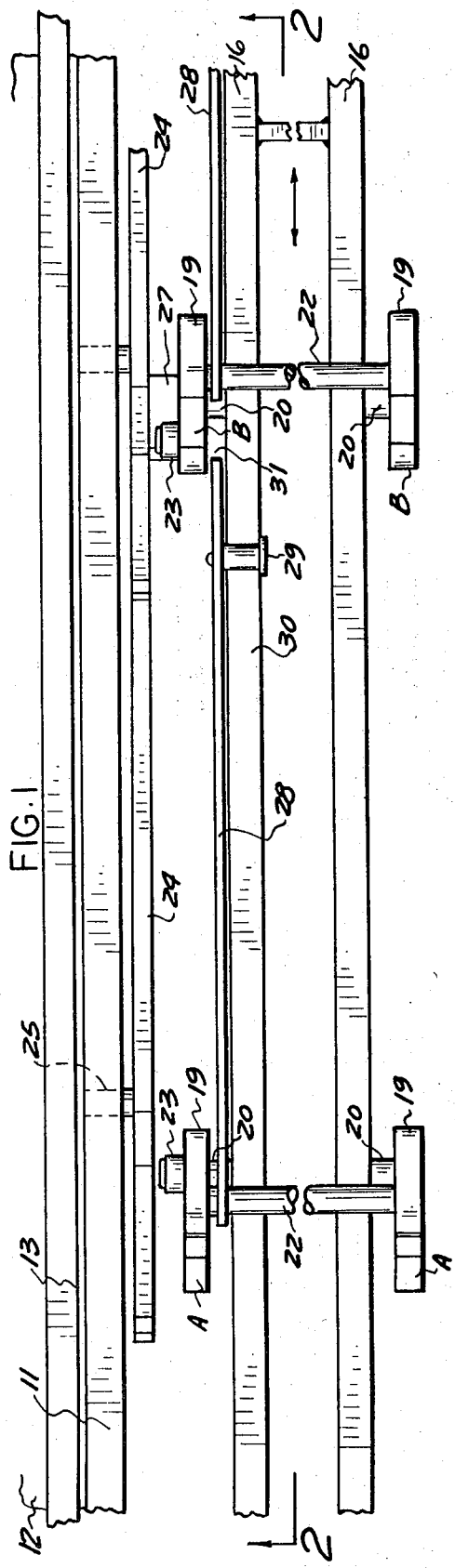
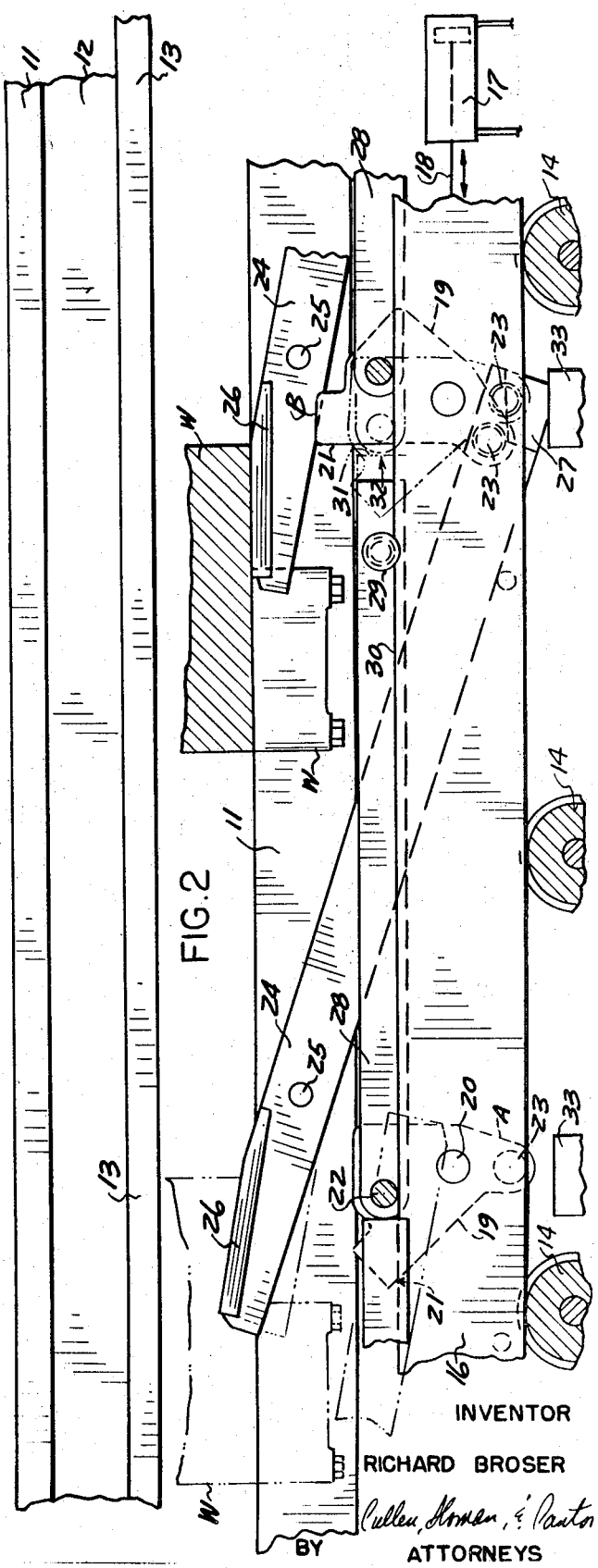

AUTOMATIC ACCUMULATING TRANSFER MECHANISM

The present invention relates to conveyors, generally, and more particularly, a mechanical, automatic accumulating transfer mechanism.

Heretofore, in automation lines or the feed line in a manufacturing plant a series of parts or workpieces longitudinally slide along tracks from station to station by virtue of reciprocating series of part pushing dogs and which incorporate some means, mechanical or otherwise, for rendering the dogs inoperative during the continuous reciprocating movements of the conveyor moving mechanism.

The devices known are involved and complicated and ineffective.

The present invention is therefore directed to an improved, mechanical, automatic, accumulating transfer mechanism by which an automatic control is incorporated into the transfer line for use in conjunction with reciprocating conveyor means and associated pushing dogs wherein in an automatic manner the pushing dogs are rendered operative when there is a requirement for advancing the parts in the line and rendered inoperative when such requirement does not exist.

For example, in an automation line and employing a reciprocating transfer mechanism incorporating a series of dogs which are effective normally for pushing or sliding or moving workpieces along such line in an automatic fashion from station to station, it is absolutely required that when all the stations are filled with a corresponding workpiece or part that the respective dogs be in inoperative clearance position in order to prevent an undesired longitudinal feed movement of a part which is yet to be machined or otherwise worked upon before moving.

It is therefore an object of the present invention to provide a mechanical, automatic accumulating transfer mechanism by which the machine automatically senses the necessity for rendering the corresponding or required pushing dogs operative for advancing the workpieces successively as desired from station to station in an automation line, for illustration.

It is an object of the present invention to provide an automatic accumulating transfer mechanism which maintains a full conveyor at all times in keeping the respective parts moving as fast as possible from one machine station to a next machine station.

It is another object to incorporate in the present accumulating transfer mechanism means by which one is able to remove a part or parts from any part of the conveyor system for any purpose such as reworking or for banking or temporary storage and still be able to move the remainder of the parts to the next machine station in a steady flow.

It is another object to incorporate in the present accumulating transfer mechanism means by which a part is removed from the conveyor system intermediate its ends. The mechanism incorporates sensing mechanism as will permit all the parts behind the space left by the removed part to be moved upward simultaneously in a steady flow without moving forwardly those parts ahead of the space left by the removed part.

It is another object of the present invention to provide a mechanism by which the parts may be loaded onto any station of an empty conveyor and the said parts are quickly moved to the next succeeding station or machine in an automatic, continuous manner wherein all gaps are filled.

It is another object to incorporate in the present accumulating transfer mechanism means by which when the conveyor is full parts filling each station and the power operated reciprocal transfer means is functioning, no moving part of the said conveyor mechanism, touches the part to be moved and thus the conveyor is able to remain idle indefinitely so that the parts will not be marked in any way by the reciprocating movement of the feed mechanism which is a full conveyor are arranged so that the dogs therein are in an inoperative clearance position.

It is another object to provide in the present transfer mechanism means by which the parts in the transfer line can be spaced to any desired spacing depending upon the design involved, nevertheless; retaining all the advantages of the continuous transfer mechanism.

Under the present invention there is no waiting for parts from the conveyor since all parts are moved forwardly as soon as the machine or part is removed. If banking is required, as the part is removed this space is immediately closed up during the idle cycle of the conveyor all incorporating the present sensing detector cam arm.

These and other objects will be seen from the following specification and claims in conjunction with the appended drawings in which:

FIG. 1 is a fragmentary plan view of the present transfer mechanism.

FIG. 2 is a fragmentary section taken in the direction of arrows 2-2 of FIG. 1.

Figure 3:
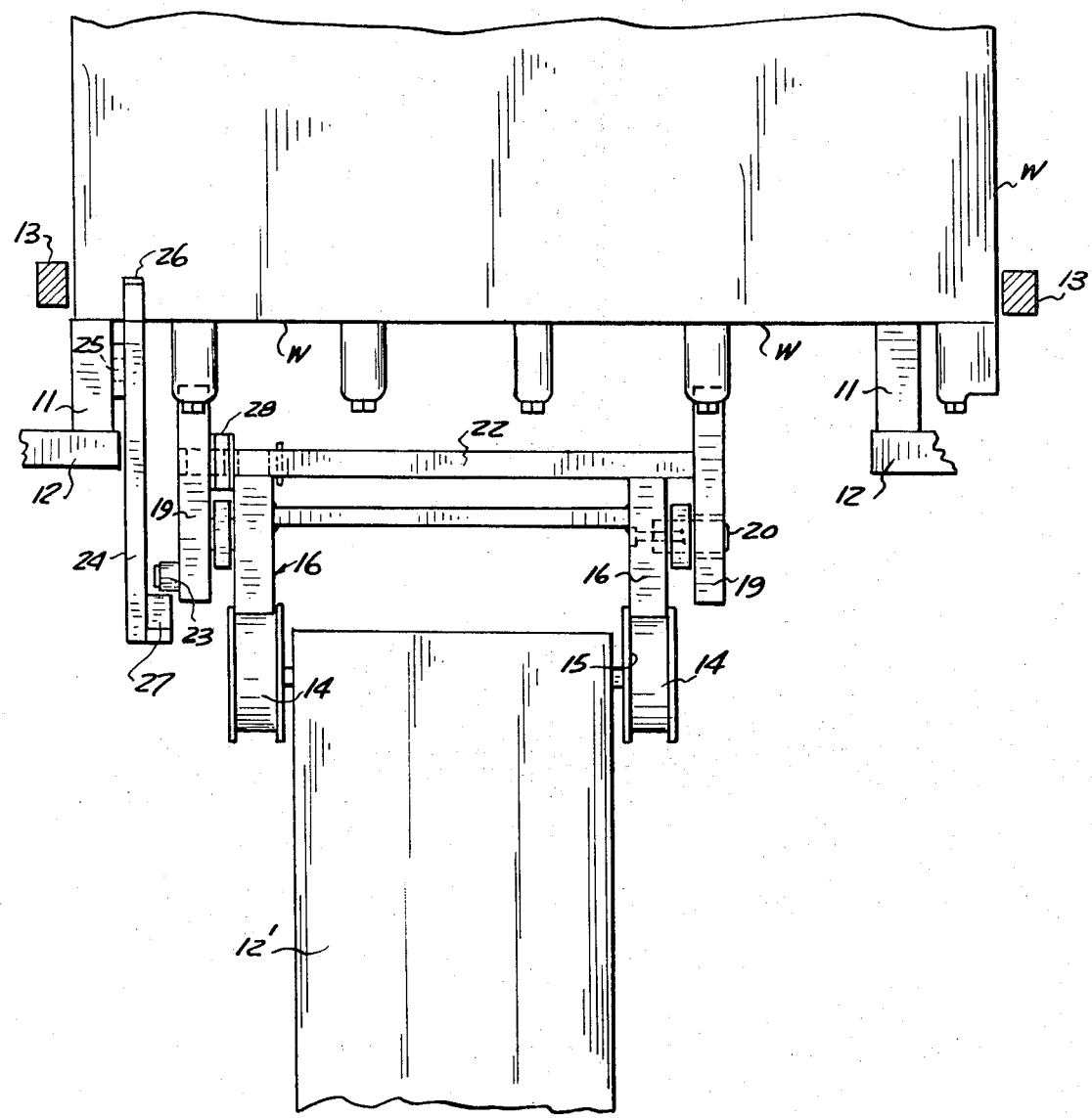
FIG. 3 is a fragmentary front elevational end view of the transfer mechanism shown in FIG. 1, as viewed from the left end thereof.

It will be understood that the above drawings illustrate merely a preferred embodiment of the invention, and that other embodiments are contemplated within the scope of the claims hereinafter set forth.

Referring to the drawings, the transfer mechanism such as might be used in an automation line for the moving of parts or workpieces from station to station for successive possible operations on the said workpieces includes a pair of parallel sa spaced support rails 11 mounted upon the base 12 fragmentarily shown, FIG. 3, the said parts generally indicated at W being arranged in longitudinally spaced relation and slidably mounted upon the said rails 11 movable between the lateral guides 13, fragmentarily shown, FIG. 3.

Between the rails 11 and upon a subbase 12' are arranged a series of longitudinally spaced pairs of support rollers 14 and outer flanges 15, the said rollers being positioned below and inwardly of rails 11, FIG. 3.

A pair of longitudinally extending spaced, interconnected, transfer bars 16 are reciprocally and guidably mounted upon rollers 14 below the rails 11 adapted for movement in unison.

A reciprocal power means such as the hydraulic or pneumatic cylinder 17, piston and piston rod assembly 18 is suitably connected to the transfer bars 16 for continuous reciprocal movements in unison. Any other form of power drive could be employed and connected to the respective transfer bars for effecting such reciprocal movements forming a part of the intermittently reciprocal conveyor mechanism.

A series of pairs of longitudinally aligned dogs (pushing) 19 are pivotally mounted at 20 upon said transfer bars being longitudinally spaced thereon, FIGS. 1 and 2, corresponding to a series of work stations along the said rails. The said dogs are reciprocally movable continuously between adjacent stations. Each of the said pairs of dogs have an upright work engaging or pushing position shown in solid lines in FIG. 2 and a forwardly inclined dotted line inoperative work clearance position caused by engagement of the said dogs with the said workpieces W on retraction of the said transfer bars 16 mounting the said dogs.

Each of the dogs has an upright work engaging surface 21, FIG. 2, said dogs being interconnected by tie bar 22 so that the pairs are adapted for pivotal movement in unison between operative and inoperative positions. It is noted that cooperative registry of tie bar 22 with the top surfaces 30 of the transfer bars limits the pivotal movements of the said dogs between operative and inoperative positions, FIG. 2.

As shown in FIG. 3, at least one of the respective pairs of dogs 19 has mounted adjacent its lower end the laterally extending cam roller 23 for cooperative registry under certain conditions with the automatic control mechanism now to be described by which the said dogs after the respective retraction movement of the transfer bars return to the inoperative dotted line position, FIG. 2, by engagement with the successive workpieces during the said retractive movement and may be cammed into the upright operative position shown, FIG. 2, under certain circumstances, such position being designated at B with the inoperative position, FIG. 2, being designated at A.

As shown in all of the figures and adjacent each of the respective stations along the support rails 11 there are provided a series of downwardly and rearwardly inclined part detector cam arms 24 which are pivotally mounted offcenter as at 25 with respect to one of the said rails 11. Each of the cam arms 24 adjacent its forward end has removably mounted thereon the part detector plate 26, which is normally arranged in the path of sliding movement of the respective workpieces W fragmentarily shown in FIG. 2 and which upon engagement with the said workpiece at a particular station pivot the cam arm 24 to the inoperative control position shown at the right of FIG. 2. If no workpiece is located at the particular station for holding the said cam arm 24 in the inoperative position shown towards the right of FIG. 2, then the said cam arm will gravitate due to the offcenter pivotal mounting 25 to the position shown on the left in FIG. 2 wherein the lower end portion of the said cam arm rests upon the stop 33 suitably mounted upon the base or subbase construction and which, in effect, limits pivotal movement in the clockwise direction automatically of the said corresponding part detector cam arm 24.

The control cam 27 mounted adjacent the lower end of cam arm 24, and in the operative control position of cam arm 24, FIG. 2, is in such position as to be in the path of rearward movement of the cam roller 23 on the adjacent dog 19 so that such retraction movements of the said dogs corresponding to that station causes the corresponding dogs to be tilted from the dotted line inoperative position at A to the solid lines operative work pushing position B as shown at the right end of FIG. 2.

In the event, however, that a part or workpiece W is resting upon the detector plate 26 of the corresponding cam arm 24, then the said cam arm has been mechanically tilted about pivot 25 as shown at the right end of FIG. 2 to an inoperative control position which elevates the control cam 27 so as to be out of the path of movement of the cam roller 23 on one of the retracting pair of dogs 19. Accordingly, such retracting movement of the said adjacent pair of dogs maintains the said dogs in the inoperative dotted line position shown. Thus, under those conditions and during continuous reciprocal movements of the transfer bars 16, the said dogs which correspond to the filled station are maintained inoperative to avoid an accidental pushing or sliding of a workpiece from that particular station until the next succeeding station forwardly in front, namely to the left in FIG. 2, has been emptied.

Referring to the drawings, a series of longitudinally extending aligned trip arms 28 are employed at their forward ends respectively mounted pivotally to the adjacent dog tie bar 22, FIG. 1. Suitable guide means in the form of flanged rollers 29 are mounted on the rearward or trailing end portions of the respective trip arms 28 and are supportably and guidably mounted upon the top edge 30 of the adjacent transfer bar 16. Thus, in the normal operation of the conveyor mechanism the rear end portion 31 of the respective trip arm is spaced forwardly of the corresponding forward end portion of the adjacent dog crossbar 22 and corresponding trip arm of the next succeeding series of dogs, as best shown in FIG. 1.

By this construction there is provided an automatic means by which all of the stations rearwardly of a station which has been opened due to the unloading of a part, which may be the first station, or any other station along the automation line, provide for automatic tilting of the respective pushing dogs to the upright position B shown by which each of the individual workpieces or parts W are simultaneously advanced to fill up the space previously occupied by the workpiece which was removed from the line or from a particular station.

Normally speaking with one station empty in the line and with all the other stations occupied by parts, the corresponding cam arms 24 would each and all be maintained in an inoperative control position and, thus, retracting movement of the respective cams would be ineffective for tilting the cams back to work pushing position. Accordingly, since it is desired that all of the workpieces be successively and simultaneously moved forwardly one space, at least, the present trip arms 28 are effective, extending from the first cam which has been automatically tilted to work pushing position by the particular operative cam arm, provides a means by which all of the succeeding dogs, which had normally remained in inoperative control, can be tilted upwardly to work securing position and provide a means by which the succeeding workpieces or parts may be successively and simultaneously moved forwardly to fill the empty space, which would not be possible without the use of the present trip arm construction.

It is therefore noted, FIG. 2, when the first or leading set of dogs 19 have been cammed to upright working position, the succeeding longitudinally disposed trip arms 28 will be moved rearwardly to engage, as at 32 FIG. 2, the corresponding dog crossbar 22 or corresponding trip arm so that all of the dogs rearwardly in the line of the dog which has been cammed to work pushing positions will also be tipped upwardly independent of the present cam control.

This has several advantages in the present construction. By this construction if a workpiece or part W is removed from the line any place therealong, the present mechanism is effective for immediately moving up all of the succeeding parts so that the space in the automation line is immediately filled and all stations therebehind.

It is noted in this connection that the respective cam arm detectors, thus, are effective for determining whether to the dogs at a corresponding station will be cammed to upright operative work-engaging position or will remain inoperative in a work clearance position shown at A, FIG. 2.

As an improvement over the prior art it is seen that the continuously reciprocal transfer mechanism which include the transfer bars 16 are moving continuously and reciprocating and will be effective for pushing the workpieces W along the support rails 11 only when this is required by virtue of the automatic control mechanism which determines whether the pushing dogs will be in inoperative or clearance position. By this construction it is impossible to push the last workpiece out of a particular work station or out of a machine, until it has been removed at the will of the operators.

Since there are a series of longitudinally aligned control arms 24 in the present system, the only control arm which will operate by gravity to move to a control position is that control arm which is not engaged by a workpiece or which has been released from a workpiece by removing of same from the line. This means, therefore, that the pushing dogs and those behind the empty station will be rendered operative for moving the parts forwardly until all spaces have been filled up. At the same time a control mechanism will be idle and in clearance position as to all stations which are loaded and, thus, the present automatic accumulating transfer mechanism is only effective in a continuously moving automation line only at that station or stations where there is a need for a part to be moved.

I claim:

1. In a mechanical automatic accumulating transfer mechanism including a pair of parallel spaced support rails upon which a series of spaced workpieces or parts are slidably mounted in an automation line:

longitudinally spaced pairs of support rollers below and inwardly of said rail;

a pair of longitudinally extending spaced transfer bars reciprocally and guidably mounted on said rollers below said rails;

power means joined to said transfer bars for causing reciprocal movement in unison of said transfer bars;

a series of aligned dogs pivotally mounted upon said transfer bars and longitudinally spaced thereon at a distance corresponding to the distance between each of a series of work stations along said rails, said dogs being reciprocally movable continuously with said transfer bars between adjacent work stations, and said dogs each having a cam follower mounted thereon;

each of said dogs having an upright workpiece-engaging position and an inclined inoperative workpiece-clearing position;

a series of downwardly and rearwardly inclined workpiece detector cam arms, each pivotally mounted at a point forward of its balance point to one of its said support rails adjacent to respective ones of said stations, so as to be normally pivoted by gravity to a first position wherein the forward upper end of each of said arms is in a first elevated position placing it in the path of sliding movement of the workpieces, said workpiece detector arms being movable to a second, inoperative position when a workpiece at the corresponding work station cams said forward upper end thereof downwardly;

a dog control cam mounted at the lower rearward end of each of said workpiece detector cam arms, said cam being so positioned as to lie in the reciprocating path of said dog cam follower of the next rearward dog when said workpiece detector cam arm is in said first position, and said cam lying out of the path of said dog cam follower when said workpiece detector cam arm lies in said second inoperative position;

dog retracting means for placing said dogs in their inoperative position upon each rearward stroke of said transfer bars; and the existence of an empty work station placing the corresponding workpiece detector cam arm in said first position, whereby on the terminal portion of the rearward stroke of said transfer bars said dog control cam mounted on such workpiece detector cam arm cams said dog at the next adjacent rearward work station to its upright workpiece-engaging position.

2. The transfer mechanism of claim 1, which further comprises a series of longitudinally extending trip arms each pivotally mounted at its forward end to a respective one of said dogs, and extending horizontally rearwardly therefrom a distance sufficient to bring the rear end thereof into abutting contact with the forward end of the next adjacent rearward trip arm when their corresponding dogs are each in either the workpiece-engaging or workpiece-clearing position, whereby the raising of any dog to the workpiece-engaging position acts to similarly position all rearwardly located dogs on a single rearward stroke of said transfer bars through the cooperation and action of said trip arms.

3. In the automatic transfer mechanism of claim 1, said dogs being arranged in pairs:

a tie bar interconnecting each pair for pivotal movement in unison and for cooperative, operative engagement with said parts;

a longitudinally extending trip arm at its forward end pivotally connected to said dog tie bar;

guide means adjacent its other end movably and supportably mounted upon one of said transfer bars; and said other end being spaced from the next adjacent dog tie bar and operatively engageable therewith on retraction of said transfer bars if the next adjacent forwardly arranged dog has been cammed into operative, work-engaging position.

4. In the automatic transfer mechanism of claim 1, a longitudinally extending trip arm at its forward end pivotally connected to one dog:

guide means adjacent its other end movably and supportably mounted upon one of said transfer bars; and said other end being spaced from the next adjacent dog and operatively engageable therewith on retraction of said transfer bars if the next adjacent forwardly arranged dog has been cammed into operative work-engaging position.